(12) United States Patent
Ajan et al.

(10) Patent No.: US 7,354,665 B2
(45) Date of Patent: Apr. 8, 2008

(54) MAGNETIC RECORDING MEDIUM AND MAGNETIC STORAGE APPARATUS

(75) Inventors: Antony Ajan, Kawasaki (JP); E. Noel Abarra, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 11/063,937

(22) Filed: Feb. 23, 2005

(65) Prior Publication Data

US 2005/0142390 A1    Jun. 30, 2005

Related U.S. Application Data

(63) Continuation of application No. PCT/JP03/00285, filed on Jan. 15, 2003.

(51) Int. Cl.
 *G11B 5/66* (2006.01)
(52) U.S. Cl. .................................. 428/832.1
(58) Field of Classification Search ............. 428/832.1, 428/832.2, 832.3
 See application file for complete search history.

(56) References Cited

U.S. PATENT DOCUMENTS

| 5,685,958 | A | 11/1997 | Futamoto et al. |
| 5,693,426 | A | 12/1997 | Lee et al. |
| 5,700,593 | A | 12/1997 | Okumura et al. |
| 5,866,227 | A | 2/1999 | Chen et al. |
| 6,096,445 | A | 8/2000 | Terakado et al. |
| 6,139,981 | A | 10/2000 | Chuang et al. |
| 6,156,404 | A | 12/2000 | Ross et al. |
| 6,562,489 | B2 | 5/2003 | Abarra et al. |
| 6,613,460 | B1 | 9/2003 | Abarra et al. |
| 6,828,047 | B2 | 12/2004 | Abarra et al. |
| 2001/0033949 | A1 | 10/2001 | Abarra et al. |

FOREIGN PATENT DOCUMENTS

| GB | 2 295 159 | 5/1996 |
| JP | 07-073441 | 3/1995 |
| JP | 2001-143250 | 5/2001 |

OTHER PUBLICATIONS

Kataoka et al.; "Magnetic and Recording Characteristics of Cr, Ta, W and Zr Pre-Coated Glass Disks"; IEEE Trans. Magn., vol. 31, pp. 2734-2736; Nov. 1995.

Oh et al.; "A Study on VMn Underlayer in CoCrPt Longitudinal Media"; IEEE Trans. Magn., vol. 37, pp. 1504-1507, Jul. 2001.

Lee et al.; "Effects of Cr Intermediate Layers on CoCrPt Thin Film Media on NiAl Underlayers"; IEEE Trans. on Magn., vol. 31, No. 6, pp. 2728-2730; Nov. 1995.

(Continued)

*Primary Examiner*—Holly Rickman
(74) *Attorney, Agent, or Firm*—Greer, Burns & Crain, Ltd.

(57) ABSTRACT

A magnetic recording medium is provided with a substrate, a recording magnetic layer made of a CoCr alloy and having a (11$\bar{2}$0) crystallographic texture, and an underlayer, made of an AlV or AlRuV alloy, disposed between the substrate and the magnetic layer.

15 Claims, 13 Drawing Sheets

OTHER PUBLICATIONS

Abarra et al.; "Longitudinal Magnetic Recording Media with Thermal Stabilization Layers"; Applied Physics Letters, vol. 7, No. 16, pp. 2581-2583; Oct. 16, 2000.

Tang et al.; Microstructure and Texture Evolution of Cr Thin Films with Thickness; J. Appl. Phys. pp. 5025-5032; Oct. 15, 1993.

Doerner et al.; Microstructure and Thermal Stability of Advanced Longitudinal Media; IEEE Trans. on Magn. vol. 36, No. 1, pp. 43-47; Jan. 2000.

Doerner et al.; Demonstration of 35 Gbits/in$^2$ in Media on Glass Substrates; IEEE Trans. on Magn. vol. 37, No. 2; pp. 1052-1058; Mar. 2001.

(a)

(b)

(c)

(a)

(b)

(c)

(a)

(b)

(c)

(a)

(b)

(a)

(b)

(c)

MAGNETIC RECORDING MEDIUM AND MAGNETIC STORAGE APPARATUS

BACKGROUND OF THE INVENTION

This application is a continuation application filed under 35 U.S.C. 111 (a) claiming the benefit under 35 U.S.C. 120 and 365 (c) of a PCT International Application No. PCT/JP2003/000285 filed Jan. 15, 2003, in the Japanese Patent Office, the disclosure of which is hereby incorporated by reference.

The PCT International Application No. PCT/JP2003/000285 was published in the English language on Jul. 29, 2004 under International Publication Number WO 2004/064047 A1.

1. Field of the Invention

The present invention generally relates to magnetic recording media and magnetic storage apparatuses, and more particularly to a magnetic recording medium having a seed layer and/or an underlayer made of AlV or an alloy thereof, and to a magnetic storage apparatus which uses such a magnetic recording medium.

2. Description of the Related Art

A typical longitudinal magnetic recording medium, such as a magnetic disk, is provided with a substrate, a seed layer, a Cr or Cr alloy underlayer, a CoCr alloy intermediate layer, a Co alloy magnetic layer where the information is written, a C overlayer, and an organic lubricant which are stacked in this order. Substrates that are being presently used include NiP-plated AlMg and Glass. The latter substrate has been getting more popularity due to its resistance to shock, smoothness, hardness, light weight, and minimum flutter especially at the disk edge.

The microstructure of the magnetic layer, which includes grain size, grain size distribution, preferred orientation and Cr segregation, strongly affects the recording characteristics of the magnetic recording medium. The microstructure of the magnetic layer has widely been controlled by the use of seed layers and underlayers and with suitable mechanical texturing of the substrates. Small grain size and grain size distribution with excellent crystallographic orientation are desired for extending the longitudinal technology for the current densities on the order of 50 Gbits/in$^2$ and for future recording technologies for the densities on the order of 100 Gbits/in$^2$ or greater.

In this specification, the seed layer is defined as a layer which is closest to the substrate and aid primarily in promoting a desired crystallographic orientation on the succeeding layers such as the underlayer deposited thereon. The seed layer is amorphous such as the widely used NiP or B2 structured materials, and has a (002), (110), or (112) fiber texture.

In addition, in this specification, the underlayer is defined as a layer which is grown on the substrate or suitable seed layer and aid primarily in improving the preferred crystallographic orientation for the subsequent deposited intermediate layers and magnetic layers on top of the underlayer. The underlayer is crystalline, as the case of the bcc structured materials such as Cr, and has a (002), (110), or (112) fiber texture. The most extensively used underlayer has been Cr or alloys of Cr with Mo, Mn, V, Ti and W where, typically, the Cr content is at least 70 at. % and the additives are used for increasing the lattice parameter. This lattice parameter increase helps to reduce the lattice mismatch between the Cr underlayer and the Co magnetic layer. These layers are usually deposited on mechanically textured or non-textured $Ni_{81}P_{19}$ substrates like Glass or Al. Mechanical texturing invariably exposes NiP to air which oxidizes the film surface. Oxidation is important for the Cr to grow with a (002) in plane texture which results in the subsequently deposited magnetic layer to have a (11$\bar{2}$0) crystallographic texture.

This is taken advantage of in a U.S. Pat. No. 5,866,227 to Chen et al. which describes a reactively sputtered NiP (with $O_2$) seed layer on Glass substrates. Typically, Cr is deposited at a temperature Ts which is greater than 180° C. to promote a (002) texture with no (110) peak in the XRD spectrum. Low Ts deposition may result in smaller grains but a (110) texture is developed. NiP does not adhere very well to Glass such that an adhesive layer described in a U.S. Pat. No. 6,139,981 to Chuang et al. may be used. On NiP seed layers, underlayer grain sizes in the order of 8 nm to 10 nm can be realized by using two Cr alloy layers and by reducing the total underlayer thickness to less than 10 nm. Increasing the total thickness tends to significantly increase the average grain size. For example, for a single layer of $Cr_{80}Mo_{20}$, at t=30 nm, the average grain size can be approximately 20 nm which is obviously inadequate for present day media noise requirements.

L. Tang et al. "Microstructure and texture evolution of Cr thin films with thickness", J. Appl. Phys., vol.74, pp.5025-5032, 1993 also observed grain diameter increase with thickness. To achieve an average grain size less than 8 nm is difficult as further reduction of the underlayer thickness results in degradation of the magnetic layer c-axis in-plane orientation (IPO). Although the underlayer average grain size can be small, a few large grains occasionally occur on which two or more magnetic grains may grow. The effective magnetic anisotropy of such grains may be reduced if magnetic isolation is not complete. Alternate approaches to reduce the grain size include inclusion of B onto the CoCrPt matrix. B inclusion reduces the grain size of recording layer and gives substantial improvement of the media noise and magnetic properties. However, adding very high percentage of B increases the fct phase and hence the crystallographic quality goes bad beyond a certain B percentage, especially over a B concentration of 8%.

A U.S. Pat. No. 5,693,426 to Lee et al. describes ordered intermetallic underlayers with the B2 structure such as NiAl and FeAl. Ordered intermetallic alloys with structures such as B2, $L1_0$, and $L1_2$ are expected to have small grain sizes presumably due to the strong binding between the component atoms. Both NiAl and FeAl grow on Glass substrates with a (211) fiber texture which makes the magnetic layer c-axis to be in-plane with a (1010) texture. Grain sizes on the order of 12 nm can be achieved even for thick layers greater than 60 nm. The use of both NiAl and Cr on NiP has also been described by a U.S. Pat. No. 6,010,795 to Chen et al. In this case, NiAl develops a (001) texture due to the (002) texture of the crystalline Cr pre-underlayer and the magnetic layer texture is Co(11$\bar{2}$0).

There are other seed layers aside from NiP that promote the Cr(002) texture. A U.S. Pat. No. 5,685,958 to Bian et al. describes refractory metals such as Ta, Cr, Nb, W, and Mo with a reactive element consisting of at least 1% nitrogen or oxygen. In the case of Ta, which is reactively sputtered with Ar+$N_2$ gas, as the $N_2$ volume fraction is increased, Cr (002) appears in the XRD spectrum as well as Co(11$\bar{2}$0). A typical underlayer thickness of 50 nm was mentioned and wide variations in the thickness were claimed to only slightly affect the media magnetic characteristics. As the volume fraction is increased to 3.3%, both peaks disappear indicating the degradation of crystallographic orientation. Bian et al. proposed a useful range of substrate temperature Ts of 150° C. to 330° C. and a more preferred range of 210° C. to 250° C. This would make the substrate temperature Ts necessary for the deposition of the Cr onto TaN similar to that onto NiP. A useful range of nitrogen partial pressure of 0.1 mTorr to 2 mTorr was also proposed. The nitrogen concentration of the TaN films are unknown but may be between 10 at. % to 50 at. %.

Kataoka et al., "Magnetic and recording characteristics of Cr, Ta, W and Zr pre-coated Glass disks", IEEE Trans. Magn., vol.31, pp.2734-2736, 1995 has reported Cr, Ta, W, and Zr pre-coating layers on Glass. For Ta films, reactive sputtering with the proper amount of $N_2$ actually improves the succeeding Cr underlayer crystallographic orientation. Cr directly deposited on Glass develop not only the preferred (002) orientation but also an undesirable (110) texture.

Oh et al., "A study on VMn underlayer in CoCrPt Longitudinal Media", IEEE Trans. Magn., vol.37, pp.1504-1507, 2001 reported a VMn alloy underlayer, where the V content is 71.3 at. % and Mn content is 28.7 at. %. V has a high melting point (1500° C.) and in principle may grow with small grains when sputtered but the texture is a very strong (110) on Glass and on most seed layers. The U.S. Pat. No. 5,693,426 to Lee et al. also proposed polycrystalline seed layers such as MgO (B1 structured) and a myriad of B2 materials such as NiAl and FeAl which form templates for the succeeding Mn-containing alloys.

Good IPO leads to an increase in remanent magnetization and signal thermal stability. It also improves resolution or the capacity of the magnetic recording medium to support high density bits. Recently developed synthetic ferrimagnetic media (SFM) provide improved thermal stability and resolution compared to conventional magnetic recording media of the same Mrt (remanent magnetization and thickness product). Seed layers that can be used for conventional magnetic recording media can also be used for SFM but the potential of the SFM for extending the limits of longitudinal recording can best be realized if the IPO is close to perfect. The IPO can be quantified by low incident angle XRD such as that made by Doerner et al., "Mirostructure and Thermal Stability of Advanced Longitudinal Media", IEEE Trans. Magn., vol.36, p.43-47, January 2001 and Doerner et al., "Demonstration of 35 Gbits/in$^2$ in media on Glass substrates", IEEE Trans. Magn., vol.37, pp.1052-1058, March 2001 (10 Gbits/in$^2$ and 35 Gbits/in$^2$ demo) or more simply by taking the ratio of the coercivity normal to and along the film plane ($h=Hc\perp/Hc//$).

The ratio h for the magnetic recording media on Cr(002)/NiP is typically $0.2<h\leq0.15$ and is observed only for badly matched underlayers and magnetic layers. For $h\leq0.15$, the M(H) hysteresis loop perpendicular to the film normal is approximately linear with field and $Hc\perp$ is typically <500 Oe. In the case of NiAl, the (211) texture is weak and a thickness greater than 50 nm is usually needed to realize the above ratio h and to reduce the occurrence of magnetic grains with a (0002) orientation. Previous work on using NiAl directly on Glass as a seed layer for conventional magnetic recording media resulted in poor squareness (h>0.25) and could not match the performance of magnetic recording media on Cr(002)/NiP. This is the case even when seed layers such as NiP and CoCrZr are employed. XRD measurements by Doerner et al. showed that the magnetic c-axes are spread over an angle greater than ±20° compared to less than ±5° for magnetic recording media on NiP/AlMg substrates. For magnetic recording media on TaN, though the Cr(002) and Co(11$\bar{2}$0) peaks are visible from the XRD data, h>0.2 and the magnetic recording media underperforms magnetic recording media on Cr(002)/NiP. The Cr alloy underlayer thickness used here is less than 10 nm, and the reduction of h was not observed by further increases in the underlayer thickness to greater than 20 nm. But unlike B2 materials and alloys such as VMn, the average grain diameter of Cr alloy underlayers rapidly increases with thickness.

Aside from the IPO, another concern in the manufacturing of the SFM is the increase in the number of chambers necessary compared to conventional magnetic recording media especially when bare Glass substrates are used. Moreover, as the throughput has to be maintained at a high level, the thickness of the deposited film is typically limited to 30 nm. Seed layers or underlayers that need to be thicker require two chambers. The typical sequential deposition must also be made in a rapid fashion not only to have a high yield but also to prevent the temperature of the high emissivity Glass disk to drop before the magnetic layers are deposited. Else, a heating step is needed which will require a separate process chamber. The disk emissivity is decreased by the seed layer and the underlayer such that both cannot be very thin. If a bias voltage is to be applied as in CVD C deposition, the total magnetic recording medium thickness needed is usually greater than 30 nm.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium having at least an underlayer of small grain sizes and excellent in-plane orientation ($h\leq0.12$), and a magnetic storage apparatus which uses such a magnetic recording medium. According to the present invention, the underlayer requires only two chambers for deposition and is of an adequate thickness to sufficiently improve the emissivity of a substrate. This may be accomplished by the use of a AlV or AlRuV alloy with or without reactively sputtering (with $N_2$ or $O_2$) an amorphous-like seed layer such as $AlV_x$, for all x, but preferably between x=30 at. % and 80 at. % or AlVRu with Ru=1% to 40% and the rest with Al and V with all atomic ratios. The underlayer grows with a (002) texture on the seed layer, thereby promoting an excellent (11$\bar{2}$0) crystallographic texture for subsequent layers such as recording magnetic layers having single-layer or multi-layer structures and SFM structures.

Still another object of the present invention is to provide a magnetic recording medium comprising a substrate, a recording magnetic layer made of a CoCr alloy and having a (11$\bar{2}$0) crystallographic texture, and an underlayer made of an AlV or AlRuV alloy disposed between the substrate and the magnetic layer. According to the magnetic recording medium of the present invention, it is possible to realize an excellent (11$\bar{2}$0) crystallographic texture for the magnetic layer, and obtain improved magnetic and S/N properties.

A further object of the present invention is to provide a magnetic storage apparatus comprising at least one magnetic recording medium, and a recording and reproducing head recording information on and reproducing information from said at least one magnetic recording medium, where each magnetic recording medium comprises a substrate, a recording magnetic layer made of a CoCr alloy and having a (11$\bar{2}$0) crystallographic texture, and an underlayer made of an AlV or AlRuV alloy disposed between the substrate and the magnetic layer. According to the magnetic storage apparatus of the present invention, it is possible to realize an excellent (11$\bar{2}$0) crystallographic texture for the magnetic layer, and obtain improved magnetic and S/N properties, so that a high-density recording of a high quality can be made.

Other objects and further features of the present invention will be apparent from the following detailed description when read in conjunction with the accompanying drawings.

DESCRIPTION OF THE PREFERRED EMBODIMENTS

Figure 1:
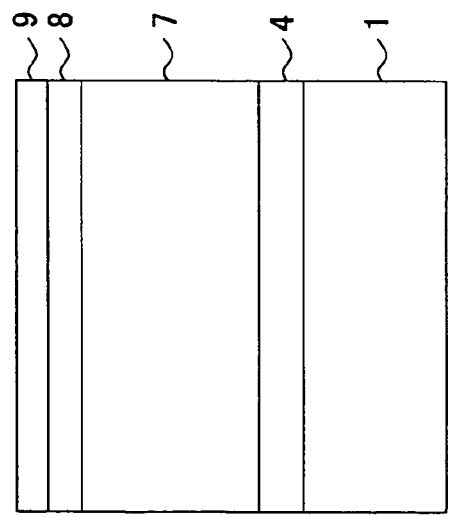
FIG. 1 is a cross sectional view showing an important part of a first embodiment of a magnetic recording medium according to the present invention.

FIG. 1 is a cross sectional view showing an important part of a first embodiment of a magnetic recording medium according to the present invention.

In the magnetic recording medium shown in FIG. 1, an underlayer 4 made of intermetallic AlV or AlRuV alloy is provided on a Glass or Al substrate 1. A recording magnetic layer 7 made of Co or Co alloy such as CoCr is provided on the underlayer 4. Information is recorded on and reproduced from the magnetic layer 7 by a recording and reproducing head which will be described later. The magnetic layer 7 has a (11$\bar{2}$0) crystallographic orientation. This magnetic layer 7 may be made up of a single layer (single-layer structure) or multiple layers (multi-layer structure). An overcoat layer 8 made of C and a lubricant layer 9 made of an organic lubricant are successively provided on the magnetic layer 7 for protection of the magnetic recording medium.

The substrate 1 may be mechanically textured. Further, the mechanical texturing may be carried out after forming the underlayer 4.

In a case where the underlayer 4 is made of the AlV or AlRuV alloy, the Ru content may be 0 at. % (that is, AlV alloy) to 40 at. %, and the rest may be Al and V alloys with all possible compositions. Alternatively, the underlayer 4 may be made of Al$_x$Ru$_y$V$_z$, where 20$\leq$x$\leq$70, 1$\leq$y$\leq$45 and 20$\leq$z$\leq$70. The underlayer 4 has a thickness in a range of 1 nm to 70 nm, and preferably in a range of 2 nm to 50 nm. These thickness ranges of the underlayer 4 promotes excellent crystallographic orientation and not develop large grains.

It should be noted that a NiP or CrP layer may be provided on the substrate 1, immediately under the underlayer 4.

The C overcoat layer 8 may be deposited by CVD, and is hard so as to protect the magnetic recording medium not only from atmospheric degradation but also from the recording and reproducing head. The lubricant layer 9 is provided to reduce stiction between the recording and reproducing head and the magnetic recording medium. For example, the C overcoat layer 8 has a thickness in a range of 1 nm to 5 nm, and the lubricant layer 9 has a thickness in a range of 1 nm to 3 nm.

Figure 2:
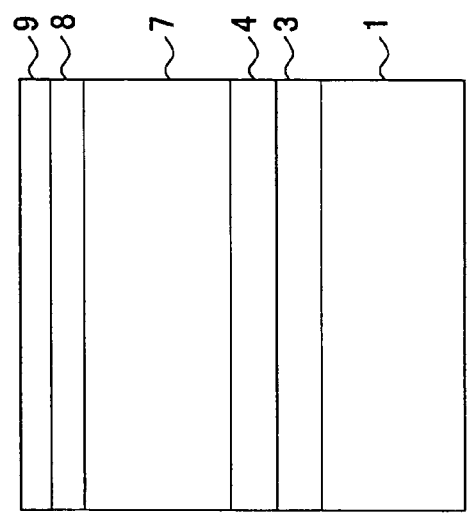
FIG. 2 is a cross sectional view showing an important part of a second embodiment of the magnetic recording medium according to the present invention.

FIG. 2 is a cross sectional view showing an important part of a second embodiment of the magnetic recording medium according to the present invention. In FIG. 2, those parts which are the same as those corresponding parts in FIG. 1 are designated by the same reference numerals, and a description thereof will be omitted.

In the magnetic recording medium shown in FIG. 2, an amorphous or polycrystalline seed layer 3 is provided between the substrate 1 and the underlayer 4. The seed layer 3 is made of AlV or AlRuV alloy. For example, the AlV or AlRuV alloy is reactively sputtered in an Ar+N$_2$ or Ar+O$_2$ gas mixture with N$_2$ or O$_2$ partial pressure P=1% to 10%. AlV$_x$N or AlV$_x$O promotes an excellent crystallographic orientation for the AlV underlayer 4 and provides excellent (002) growth for Cr based subsequent layers and very good (11$\bar{2}$0) texture for magnetic layer 7. Hence, the provision of the seed layer 3 further improves the IPO compared to the first embodiment of the magnetic recording medium shown in FIG. 1.

The substrate 1 may be mechanically textured. Further, the mechanical texturing may be carried out after forming the seed layer 3 and/or the underlayer 4.

The seed layer 3 may be made of AlV or Al$_x$Ru$_y$V$_z$, where 20$\leq$x$\leq$70, 1$\leq$y$\leq$45 and 20$\leq$z$\leq$70. The present inventors found that AlV$_x$ is useful in the entire composition ranges studied, even though it has complex binary alloy forms at different composition ranges. However, it was also found that normally, 35% to 65% of V content in the AlV$_x$ alloy gives better IPO than the other cases where V is either too low or too large. The thickness of the seed layer 3 is in a range of 1 nm to 100 nm, and preferably in a range of 1 nm to 70 nm. These thickness ranges of the seed layer 3 promotes excellent crystallographic orientation and not develop large grains.

It should be noted that a NiP or CrP pre-seed layer may be provided on the substrate 1, immediately under the seed layer 3. Alternatively, the seed layer 3 may be made of NiP or CrP pre-coated on the Glass or Al substrate 1. For example, the NiP pre-seed layer or NiP seed layer 3 promotes an excellent crystallographic orientation for the AlV or AlVN underlayer 4.

Furthermore, the seed layer 3 may be made of Ta or CrTa, reactively sputtered onto the Glass or Al substrate 1. For example, $Cr_xTa_{100-x}$ is reactively sputtered in an $Ar+N_2$ or $Ar+O_2$ gas mixture with $N_2$ or $O_2$ partial pressure P=1% to 10%, where x=20 at. % to 60 at. %, and TaN where a $N_2$ partial pressure $P_N$ relative to Ar during the sputtering is 3% to 9%. The present inventors found that TaN is advantageous for the magnetic recording medium over NiP coated substrates and having very good in-plane orientation.

The combination of the AlV or AlRuV alloy seed layer 3 and the underlayer 4 provides excellent IPO matching than that of magnetic recording media made on NiP seed layer on Glass or aluminum.

Figure 3:
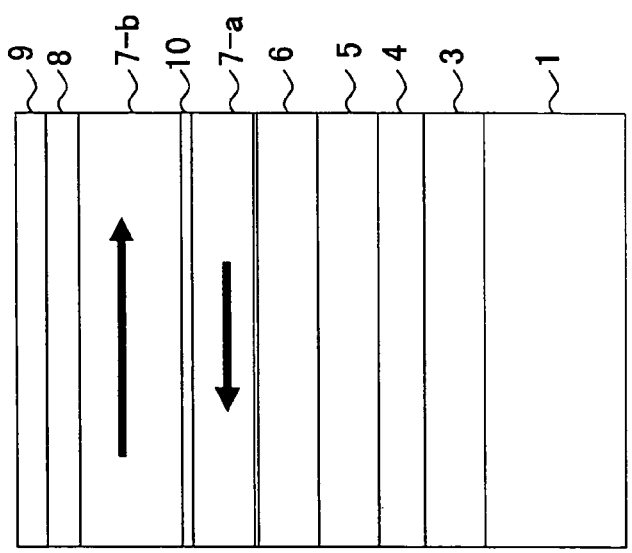
FIG. 3 is a cross sectional view showing an important part of a third embodiment of the magnetic recording medium according to the present invention.

FIG. 3 is a cross sectional view showing an important part of a third embodiment of the magnetic recording medium according to the present invention. In FIG. 3, those parts which are the same as those corresponding parts in FIGS. 1 and 2 are designated by the same reference numerals, and a description thereof will be omitted. In this third embodiment of the magnetic recording medium, the present invention is applied to the synthetic ferrimagnetic media (SFM).

In the magnetic recording medium shown in FIG. 3, a buffer layer 5 made of a Cr alloy is provided on the underlayer 4. The buffer layer 5 is provided for lattice matching with a magnetic layer 7a and preventing V diffusion into the magnetic layer 7a. In addition, an interlayer 6 made of a hcp material such as CoCr alloy is provided on the buffer layer 5. The interlayer 6 also serves as a buffer between the bcc underlayer 4 and hcp magnetic layer 7a. Furthermore, a pair of magnetic layers 7a and 7b made of a CoCr alloy or the like are antiferromagnetically coupled via a spacer layer 10 made of Ru or the like, so that magnetization directions of the magnetic layers 7a and 7b are antiparallel. The magnetic layers 7a and 7b and the spacer layer 10 form the magnetic layer 7 having a multi-layer structure.

The magnetic layers 7a and 7b are antiferromagnetically coupled via the spacer layer 10, such that c-axes of magnetic layers 7a and 7b are significantly parallel to the film plane (substrate surface) such that h=Hc⊥/Hc//≦0.15, where Hc⊥ denotes a coercivity (or perpendicular coercivity) perpendicular to the film plane and Hc// denotes a coercivity (or in-plane coercivity) along the film plane. The SFM has improved thermal stability but require excellent in-plane orientation which is provided by the underlayer-seed layer combination.

The buffer layer 5 may be made of Cr-M with a thickness in a range of 1 nm to 10 nm, where M is a material selected from a group consisting of Mo, Ti, V, and W of atomic proportion ≧10%. Cr-rich alloys adhere well to many types of materials such that it makes a good buffer layer between the proposed underlayer 4 and the magnetic layer 7a. The buffer layer 5 prevents the diffusion of too much V into the magnetic layer 7a. Since the Cr lattice parameter (a=0.2886 nm) is smaller than the AlV underlayer lattice parameter (a≧0.29 nm), it is advantageous to alloy Cr with a larger element such as those described above. Alloying also helps the Cr lattice to expand a little so that lattice matching with the magnetic layers 7a and 7b is maintained well.

The interlayer 6 may be made of a slightly magnetic or nonmagnetic hcp structured CoCr alloy with a thickness in range of 1 nm to 5 nm. When hcp magnetic CoCr alloys are grown directly on bcc Cr alloy films, a portion of the magnetic layer in contact with the bcc underlayer 4 is adversely affected due to lattice mismatch and/or Cr diffusion from the seed layer 3, thereby causing reduction of the magnetic anisotropy of the magnetic layer as well as the total magnetization. The use of the hcp non-magnetic interlayer 6 prevents such undesirable effects to happen on the magnetic layer. As a result, the magnetic anisotropy is increased, as well as the coercivity, and the in-plane orientation is improved as this added interlayer 6 provides a way to gradually match lattice parameters. Therefore, full magnetization is obtained, that is, the so-called "dead layer" is minimized. Moreover, the formation of smaller grains at the interface is also minimized by the provision of the interlayer 6.

The interlayer 6 may also be made essentially of Ru with a thickness in a range of 1 nm to 3 nm. Ru in this case serves a similar purpose as the CoCr alloys. However, since the lattice parameters of Ru are larger than Co magnetic alloys used for the magnetic recording media, the interlayer 6 cannot be too thick.

Of course, it is possible to provide only the buffer layer 5 or the interlayer 6. Further, the buffer layer 5 and the interlayer 6 may be omitted. Moreover, it is also possible to provide the buffer layer 5 and/or the interlayer 6 in the first and second embodiments of the magnetic recording medium shown in FIGS. 1 and 2.

Figure 4:
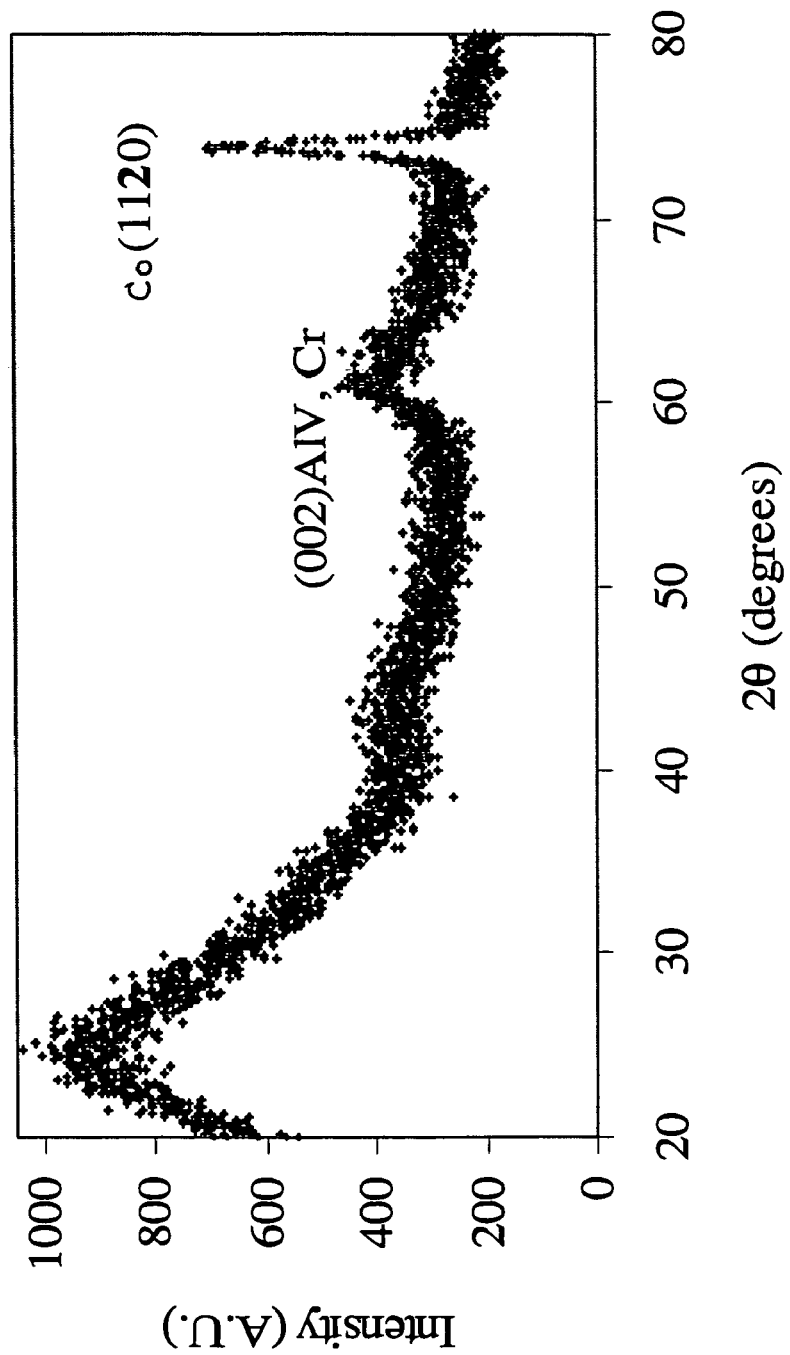
FIG. 4 shows an XRD spectrum for a magnetic recording medium having a structure formed by Glass(or Al)/AlVN(20 nm)/AlV(20 nm)/Cr$_{75}$Mo$_{25}$(5 nm)/CCPB(15 nm) for various composition ranges of Al and V.

FIG. 4 shows an XRD spectrum for a magnetic recording medium having a structure formed by Glass(or Al)/AlVN(20 nm)/AlV(20 nm)/$Cr_{75}Mo_{25}$(5 nm)/CCPB(15 nm). In FIG. 4, the ordinate indicates the intensity in arbitrary units, and the abscissa indicates 2θ (degrees). Glass (or Al), AlVN, AlV, $Cr_{75}Mo_{25}$ and CCPB (CoCrPtB) respectively correspond to the substrate 1, the seed layer 3, the underlayer 4 and the magnetic layer 7. First, the AlV underlayer 4 was formed with a $N_2$ partial pressure $P_N$=8% on the AlVN seed layer 3 which is provided on the Glass (or Al) substrate 1, and the CCPB magnetic layer 7 was deposited at 230° C. Peaks corresponding to AlV (002) and Cr(002) were observed with an excellent Co(11$\bar{2}$0) texture in almost all cases, as shown in FIG. 4. However, it was confirmed that V concentrations between 35% and 65% give excellent Co(11$\bar{2}$0) orientation than the extreme other composition ranges.

Figure 5:
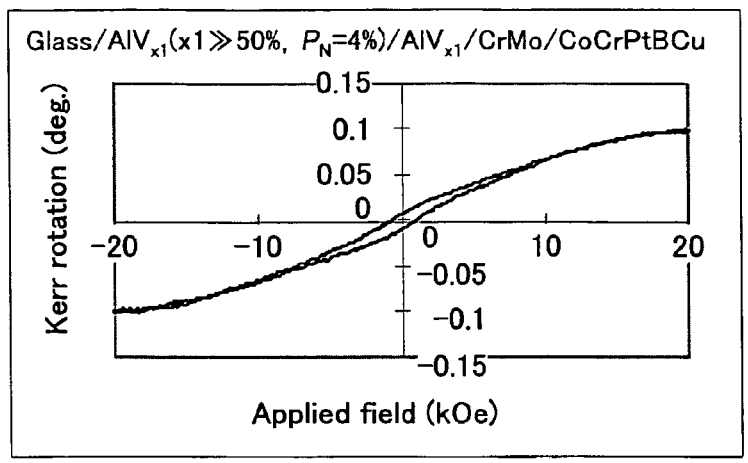
FIGS. 5(a), 5(b) and 5(c) respectively show perpendicular hysteresis loops of magnetic recording media having structures formed by Glass/AlV$_{x1}$(x1>>50%)/AlV$_{x1}$/CrMo/CoCrPtBCu(18 nm), Glass/AlV$_{x2}$(x2$\geq$50%)/AlV$_{x2}$/CrMo/CoCrPtBCu(18 nm) and Glass/AlV$_{x3}$(x3<50%)/AlV$_{x3}$/CrMo$_{25}$/CoCrPtBCu(18 nm)
Figure 5:
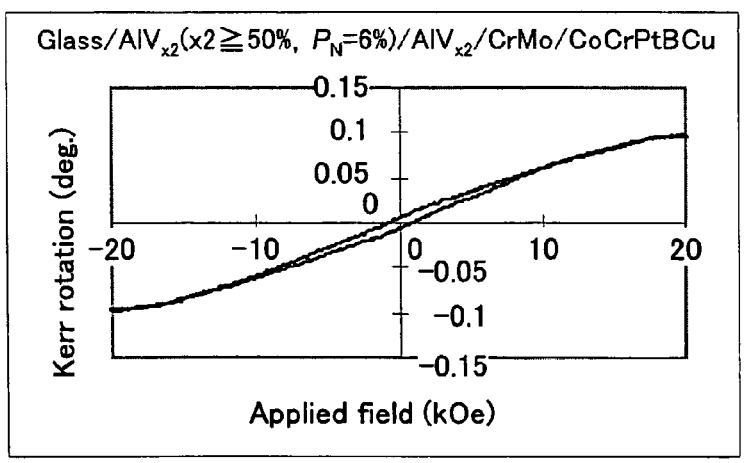
Figure 5:
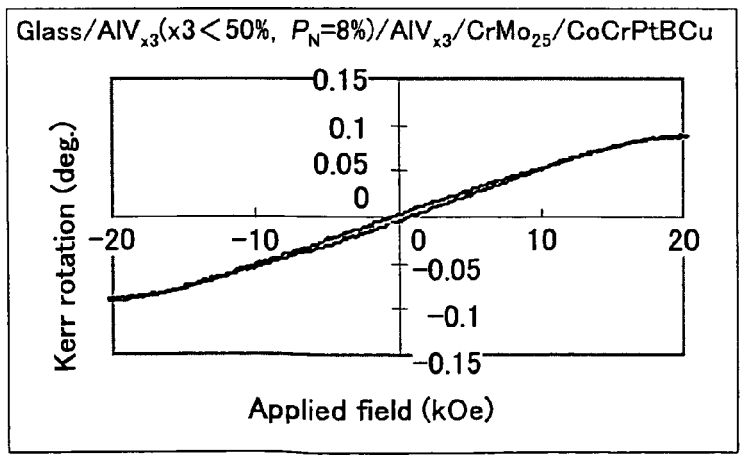
Figure 6:
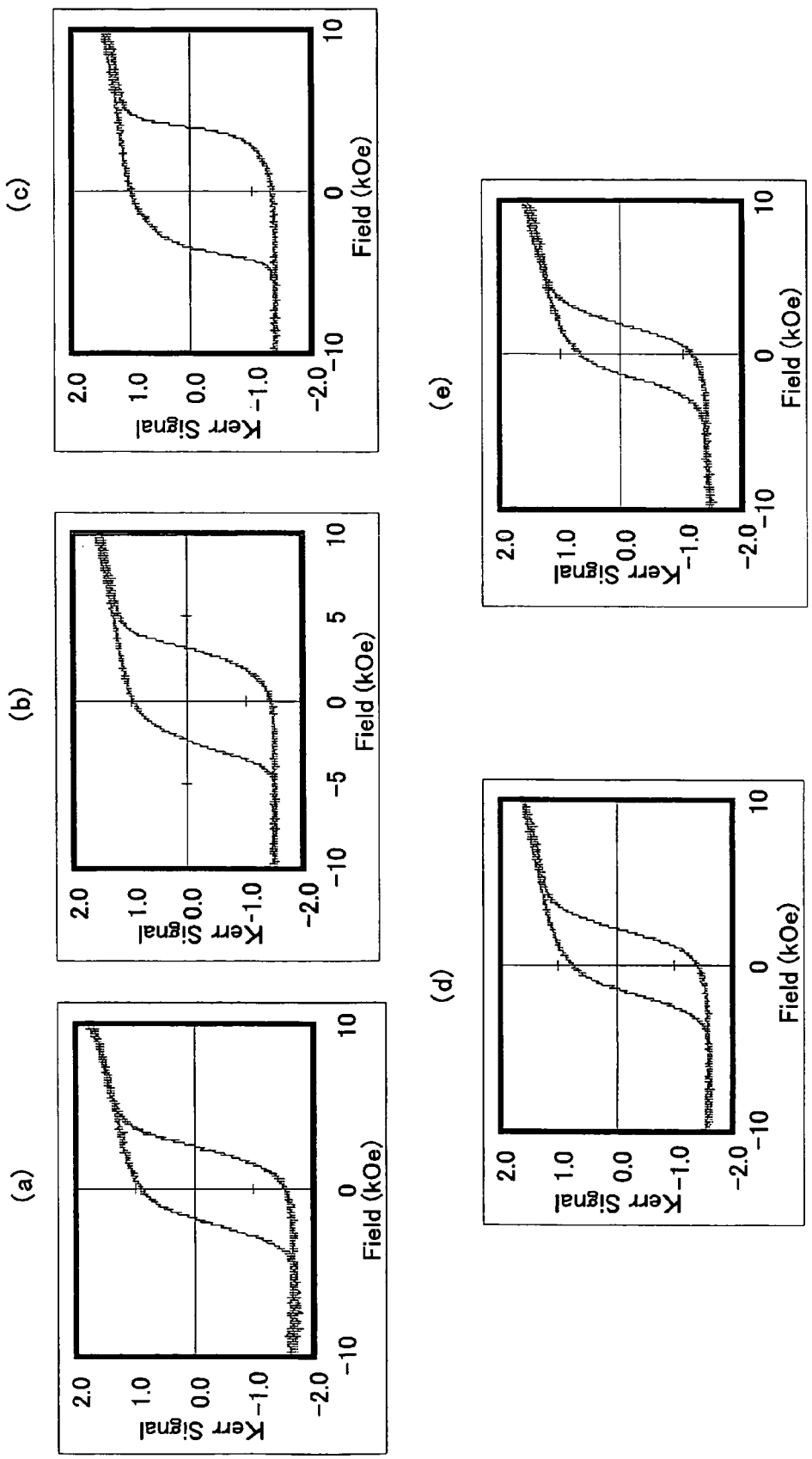
FIGS. 6(a) through 6(e) show in-plane hysteresis loops for explaining the effects of N$_2$ reactive sputtering of a seed layer directly on top of a glass substrate.
Figure 7:
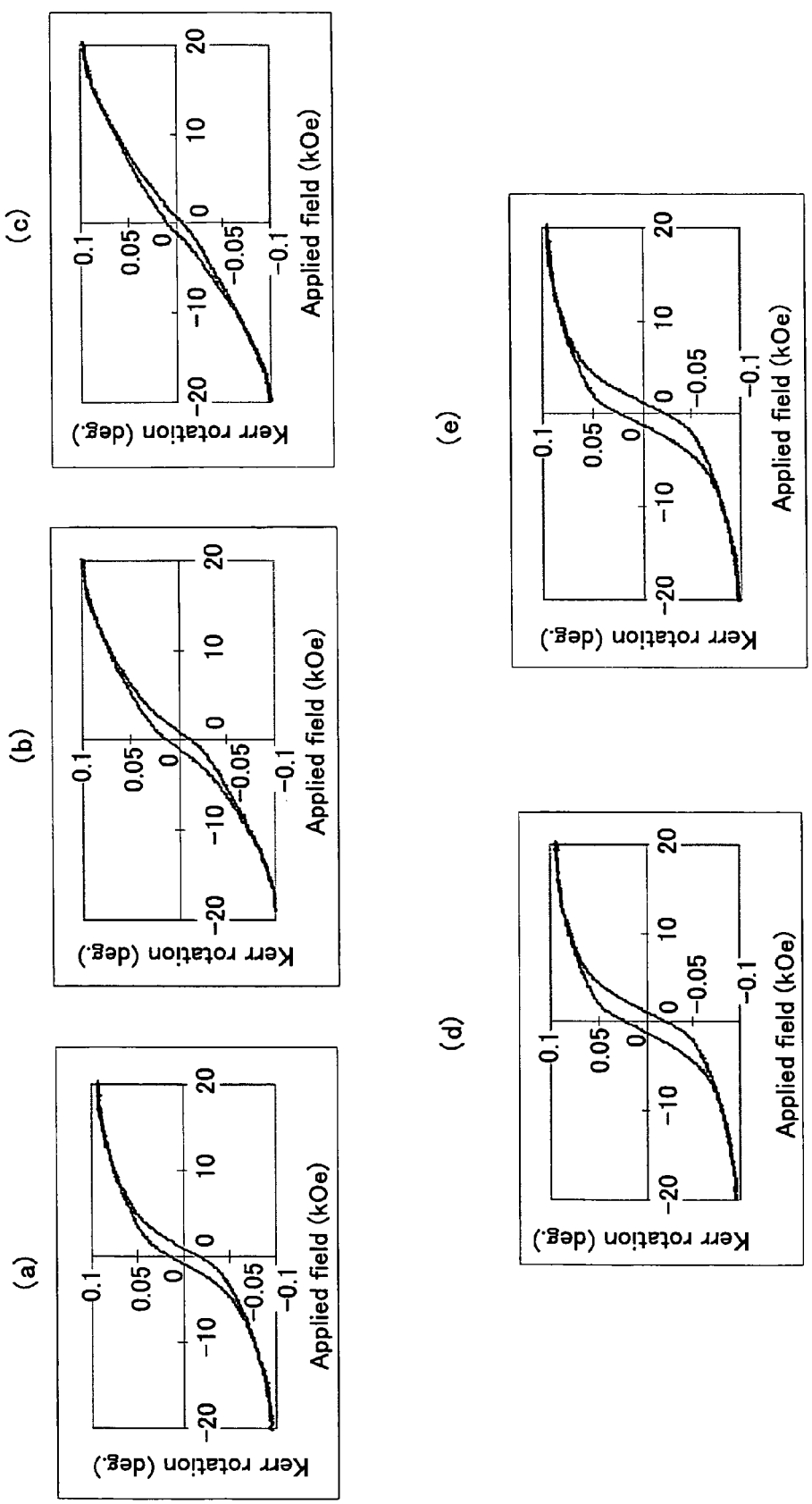
FIGS. 7(a) through 7(e) show perpendicular hysteresis loops for explaining the effects of N$_2$ reactive sputtering of a seed layer directly on top of a glass substrate.

The perpendicular hysteresis loops for various composition ranges of Al and V were measured with a Kerr magnetometer and are shown in FIGS. 5(a), 5(b) and 5(c). FIG. 5(a) shows a case where the magnetic recording medium has a structure formed by Glass/AlV$_{x1}$(x1>>50%, $P_N$=4%)/AlV$_{x1}$/CrMO/COCrPtBCu(18 nm), FIG. 5(b) shows a case where the magnetic recording medium has a structure formed by Glass/AlV$_{x2}$(x2≧50%, $P_N$=6%)/AlV$_{x2}$/CrMO/COCrPtBCU(18 nm), and FIG. 5(c) shows a case where the magnetic recording medium has a structure formed by Glass/AlV$_{x3}$(x3<50%, $P_N$=8%) /AlV$_{x3}$/CrMO$_{25}$/CoCrPtBCu(18 nm), where $P_N$ indicates the $N_2$ partial pressure. In FIGS. 5(a) through 5(c), the ordinate indicates the Kerr rotation (degrees), and the abscissa indicates the applied field kOe.

It was found from FIGS. 5(a) through 5(c) that the smallest Hc⊥ is exhibited by the structure with V concentration in a range of approximately 35 at. % to 65 at. %. It was also found that for V, concentration less than 50 at. % gave IPO of 0.12 with large in-plane coercivity (4200 Oe) with simpler structure like Glass/AlVN/AlV/CrMo$_{25}$/ CoCrPtBCu without a Co alloy buffer layer. Comparing this with a magnetic recording medium having a structure made up of Cr(002)/CoCr/Magnetic layer on top of a NiP seed layer on a glass substrate, this value is much better. This IPO is obtained with a simpler structure on the AlV seed layer and employing the underlayer without an interlayer. Hence, it was confirmed that the present invention provides a promising way to reduce the number of sputtering chambers required to produce the magnetic recording medium and hence reduce the cost of the magnetic recording medium.

FIGS. 6(a) through 6(e) and FIGS. 7(a) through 7(e) show the effect of $N_2$ reactive sputtering of a seed layer directly on top of a glass substrate. In the in-plane hysteresis loops shown in FIGS. 6(a) through 6(e), the ordinate indicates the Kerr signal in arbitrary units, and the abscissa indicates the field (kOe). Further, in the perpendicular hysteresis loops shown in FIGS. 7(a) through 7(e), the ordinate indicates the Kerr rotation (degrees), and the abscissa indicates the applied field (kOe). A structure Glass/AlVN/AlV/CrMo25/ CoCrPtBCu was grown with $N_2$ partial pressure $P_N$ used for reactive sputtering varied from 2 to 10%. $P_N$=2 for FIGS. 6(a) and 7(a), $P_N$=4% for FIGS. 6(b) and 7(b), $P_N$=6% for FIGS. 6(c) and 7(c), $P_N$=8% for FIGS. 6(d) and 7(d), and $P_N$=10% for FIGS. 6(e) and 7(e).

The best IPO was observed for $P_N$=6% to 8%. However, the results differed depending on the V concentration of the seed layer material. It was also found that with increase in $N_2$ partial pressure $P_N$ the in-plane coercivity increases and the out-of-plane coercivity decreases. It is much easier to tune the relative percentage of $N_2$ to get the good in-plane orientation. In this case, $P_N$=6% was found to be the best. Also, it was found that for higher V content lower $N_2$ partial pressure $P_N$ is enough to produce a good IPO. The loop shape, coercivity and squareness values all indicated that the $N_2$ partial pressure $P_N$=6% is better for this particular AlV composition.

Figure 8:
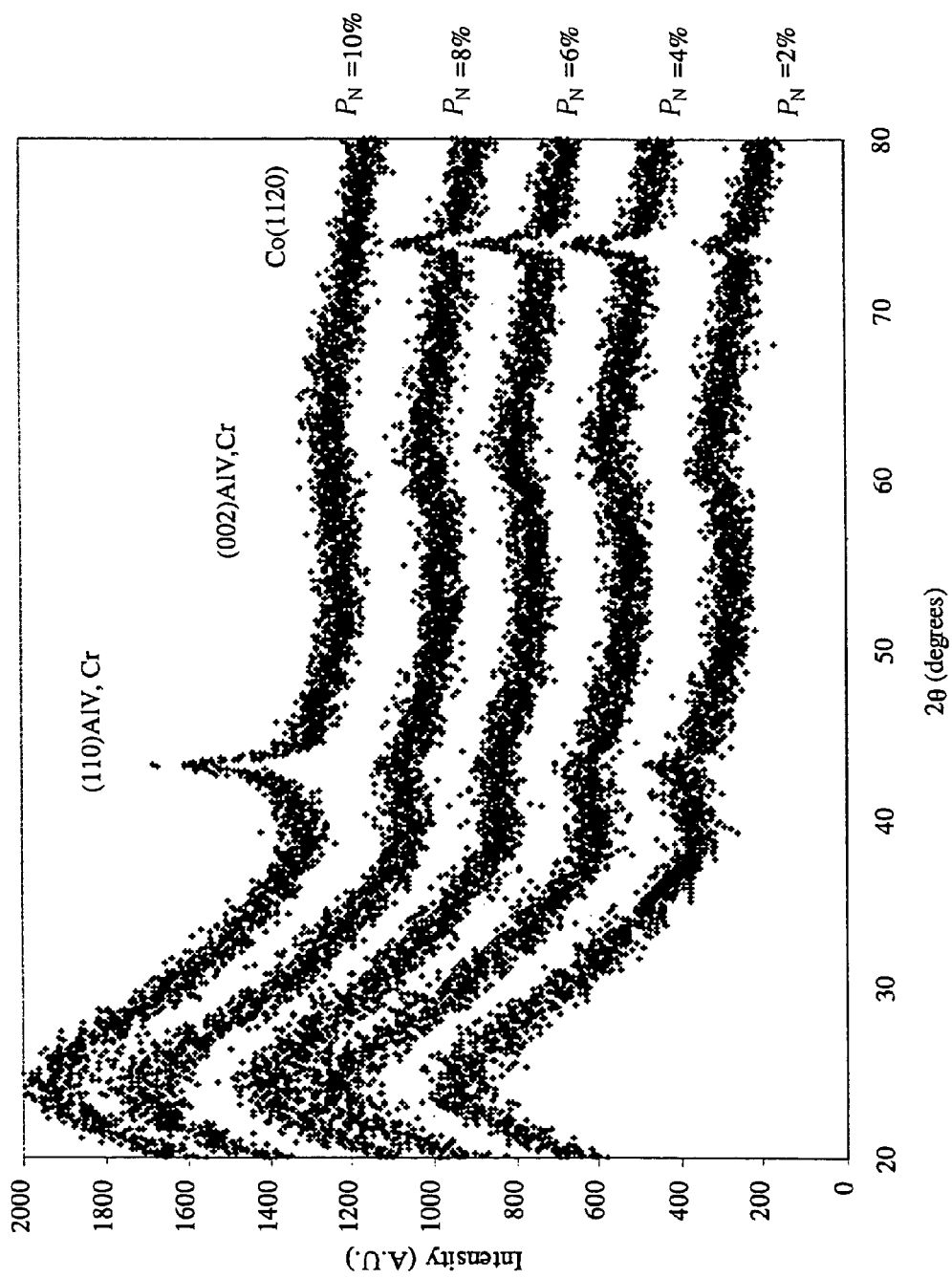
FIG. 8 shows XRD spectra of films with different N$_2$ partial pressures P$_N$ used to deposit the AlV seed layer.

FIG. 8 shows XRD spectra for different $N_2$ partial pressures $P_N$ used to deposit the AlV seed layer. More particularly, the different $N_2$ partial pressures $P_N$ are 2, 4%, 6%, 8% and 10%. In FIG. 8, the ordinate indicates the intensity in arbitrary units, and the abscissa indicates 2θ (degrees) From FIG. 8, it was found that the $N_2$ partial pressures $P_N$ of 6% shows the best Co(11$\bar{2}$0) texture.

Figure 9:
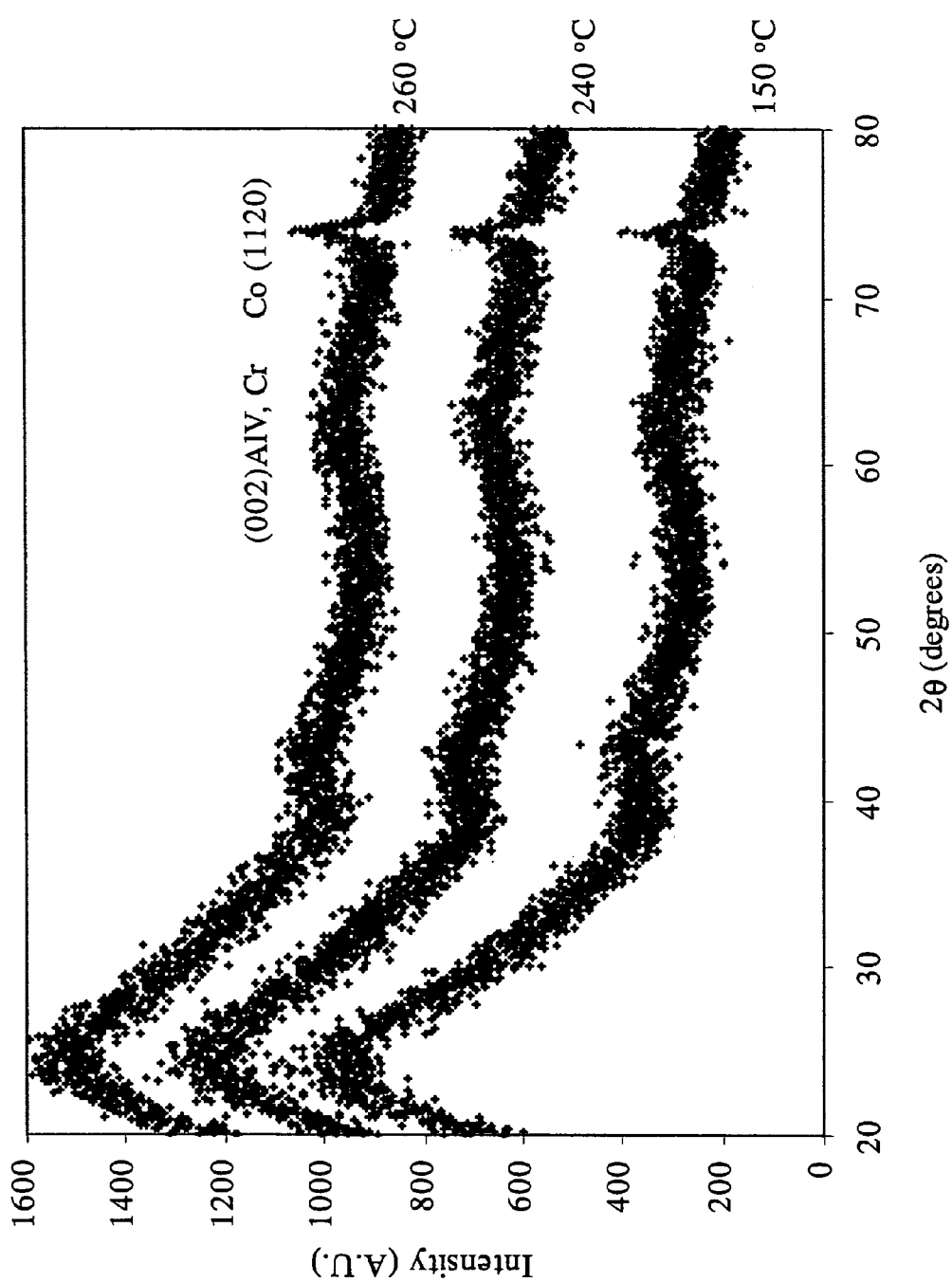
FIG. 9 shows XRD spectra for samples with different substrate temperatures for same composition for AlVN and AlV and subsequent CrMo$_{25}$ layer and CoCrPtBCu magnetic layer.

FIG. 9 shows XRD spectra for samples with different substrate temperatures for same composition for AlVN and AlV and subsequent CrMo$_{25}$ layer and CoCrPtBCu magnetic layer. More particularly, the different substrate temperatures are 150° C., 240° C. and 260° C. In FIG. 9, the ordinate indicates the intensity in arbitrary units, and the abscissa indicates 2θ (degrees). Although the seed layers AlV and AlRuV can be deposited at a wide variety of substrate temperatures from room temperature (RT) to 300° C., a most preferred range of the substrate temperature is 150° C. to 260° C. At a high substrate temperature for the particular AlV alloy or AlRuV alloy, it was found that the intensity of Co(11$\bar{2}$0) peak increases.

Figure 10:
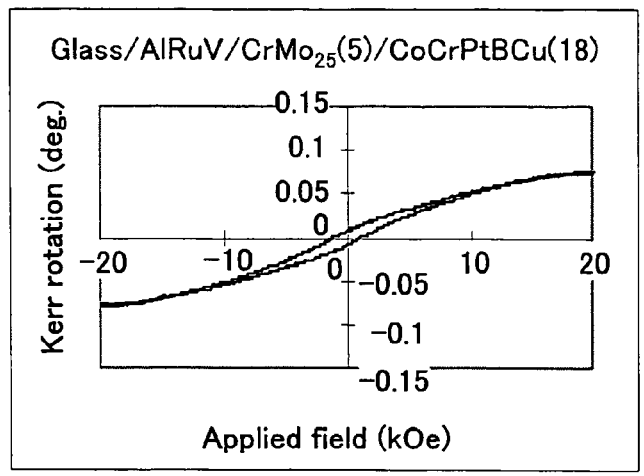
FIGS. 10(a), 10(b) and 10(c) show perpendicular hysteresis loops for explaining the effects of AlRuV underlayer and seed layer.
Figure 10:
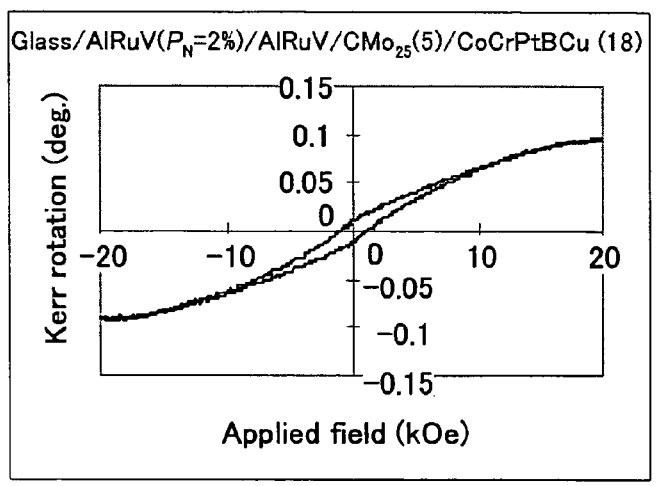
Figure 10:
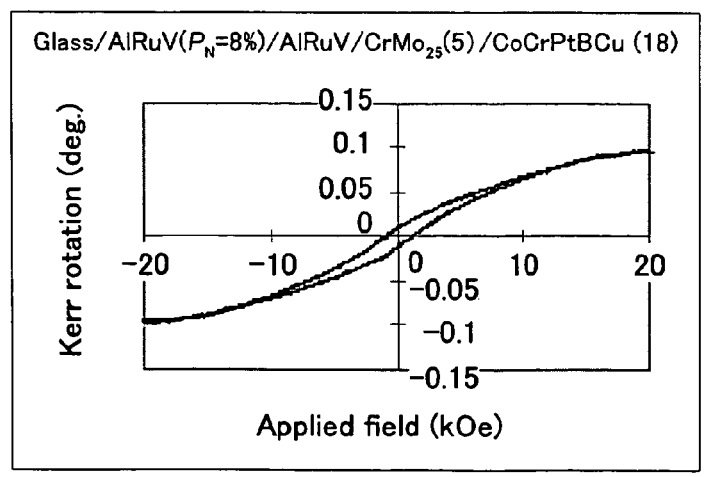

FIGS. 10(a), 10(b) and 10(c) show the effects of AlRuV underlayer and seed layer. In FIGS. 10(a) through 10(c), the ordinate indicates the Kerr rotation (degrees), and the abscissa indicates the applied field (kOe). FIG. 10(a) shows the perpendicular hysteresis loop for the magnetic recording medium with a structure Glass/AlRuV/CrMo$_{25}$(5 nm)/ CoCrPtBCu(18 nm), FIG. 10(b) shows the perpendicular hysteresis loop for the magnetic recording medium with a structure Glass/AlRuV ($P_N$=2%) /AlRuV/CrMo$_{25}$ (5 nm) /CoCrPtBCu(18 nm), and FIG. 10(c) shows the perpendicular hysteresis loop for the magnetic recording medium with a structure Glass/AlRuV/AlRuV/CrMo$_{25}$(5 nm)/CoCrPtBCu(18 nm), with a slightly lower V concentration.

In the cases shown in FIGS. 10(a) through 10(c), the Ru concentration used was 10% and the V concentration used was 40% or 35%. Other seed layer materials like TaN, CrTaN, CrP, NiP also give good IPO when used with AlRuV as in the case of AlV underlayers. However, AlVN indicates a superior IPO in comparison to the NiP seed layer. Also, when AlV or AlRuV is used as the seed layer, different underlayers other than AlV or AlRuV, such as VMn, and Cr-M can be used, where M=Mo, V, TiW or B2 structured materials to obtain good IPO.

Figure 11:
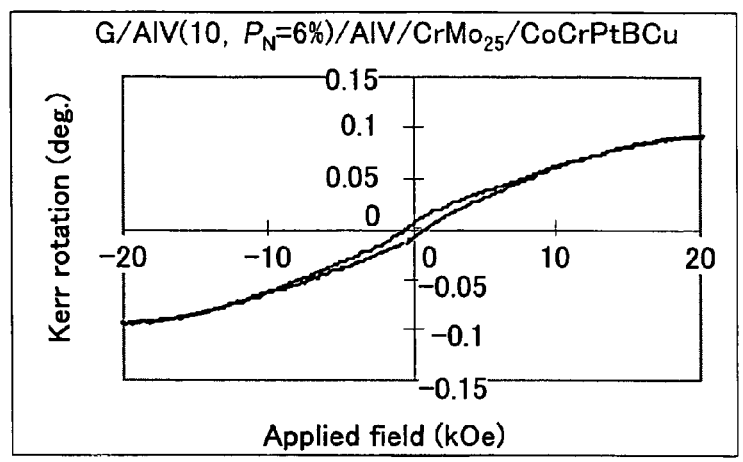
FIGS. 11(a), 11(b) and 11(c) show perpendicular hysteresis loops for explaining the effects of seed layer thickness.
Figure 11:
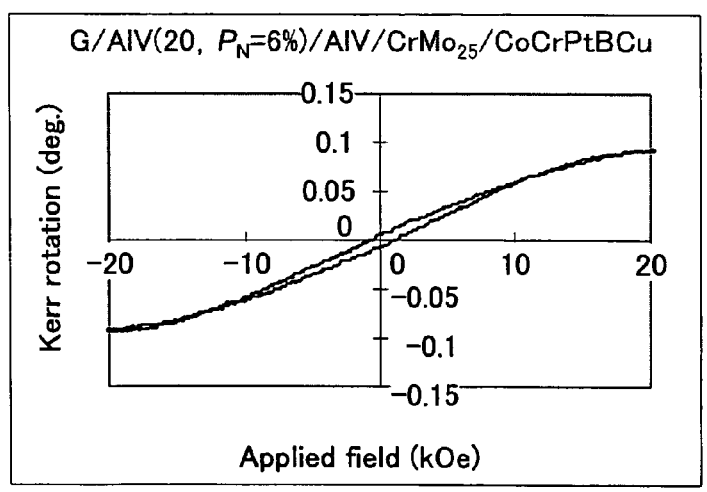
Figure 11:
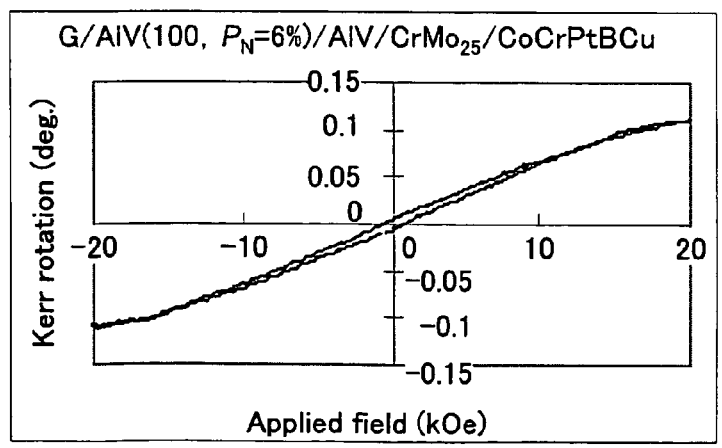

FIGS. 11(a), 11(b) and 11(c) show the effects of seed layer thickness. In FIGS. 11(a) through 11(c), the ordinate indicates the Kerr rotation (degrees), and the abscissa indicates the applied field (kOe). FIG. 11(a) shows the perpendicular hysteresis loop for the magnetic recording medium with a structure Glass/AlV(10 nm, $P_N$=6%)/AlV/CrMO$_{25}$/CoCrPtBCu, FIG. 11(b) shows the perpendicular hysteresis loop for the magnetic recording medium with a structure Glass/AlV (20 nm, $P_N$=6%)/AlV/CrMO$_{25}$/CoCrPtBCu, and FIG. 11(c) shows the perpendicular hysteresis loop for the magnetic recording medium with a structure Glass/AlV(100 nm, $P_N$=6%) /AlV/CrMO$_{25}$/COCrPtBCu.

In the cases shown in FIGS. 11(a) through 11(c), the seed layer used is AlV$_x$ (x≧50%) reactively sputtered with 6% $N_2$ along with Ar, and the thickness of the seed layer is varied from 10 nm to 100 nm. It was confirmed that the IPO is already good at the seed layer thickness of 10 nm and it continues to remain almost identical up to a seed layer thickness of 100 nm. However, when the actual magnetic recording medium is made as the product, it was found that the total thickness of the seed layer and the underlayer is preferably in a range of 30 nm to 60 nm. Thus, AlVN proved to be very effective in this total thickness range. In addition, as will be described later, the IPO is better than that for the NiP seed layer on glass. This preferred range of total thickness can be deposited in just two chambers and reduces the drop in glass substrate temperature during deposition of subsequent layers. Hence, the combination of the seed layer and the underlayer of the present invention allows a wide range of process (deposition) temperatures. The seed layer and the underlayer can be deposited in a temperature range from room temperature to 300° C., and preferably in a range of 150° C. to 260° C.

Figure 12:
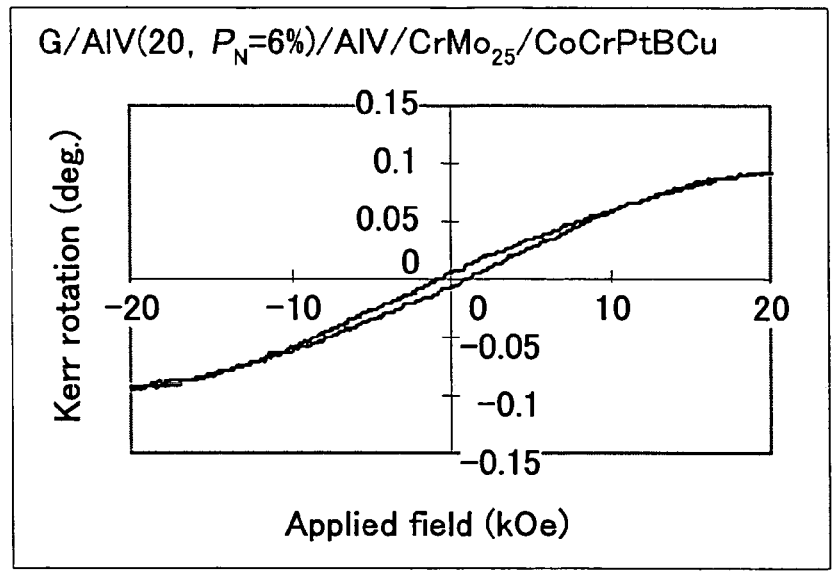
FIGS. 12(a) and 12(b) respectively show the perpendicular hysteresis loops for magnetic recording media using CoCrPtBCu magnetic layer on AlV/AlVN/Glass with and without Cr$_{75}$Mo$_{25}$.
Figure 12:
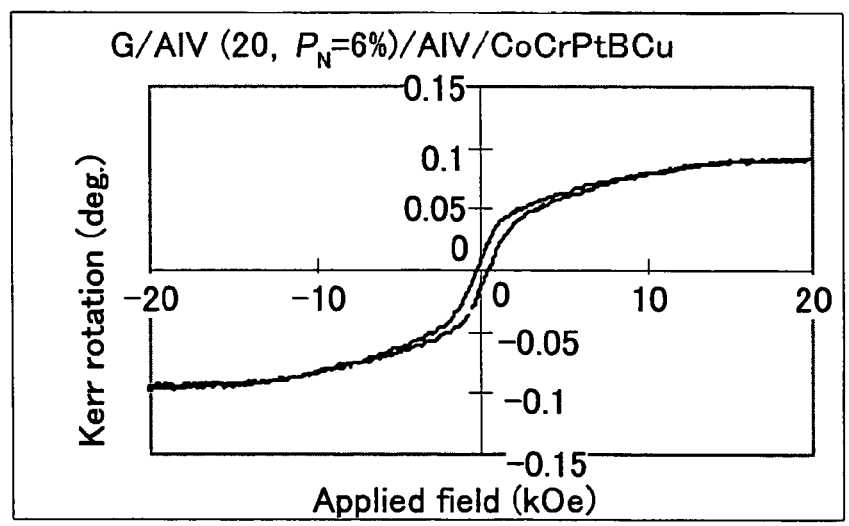

The present inventors found that magnetic layers with B have the crystallographic orientation behavior that is sensitive to the presence or absence of a Cr alloy between the AlV or AlRuV underlayer and the magnetic layer. FIGS. 12(a) and 12(b) respectively show the perpendicular hysteresis loops for magnetic recording media using CoCrPtBCu magnetic layer on AlV/AlVN/Glass with and without Cr$_{75}$Mo$_{25}$. In FIGS. 12(a) and FIG. 12(b), the ordinate indicates the Kerr rotation (degrees), and the abscissa indicates the applied field (kOe). As may be seen from FIG. 12(b), without the Cr$_{75}$Mo$_{25}$ layer, a magnetic anisotropy $H_K$ of the magnetic recording medium having the CoCrPtBCu magnetic layer is slightly reduced compared to that shown in FIG. 12(a).

Figure 13:
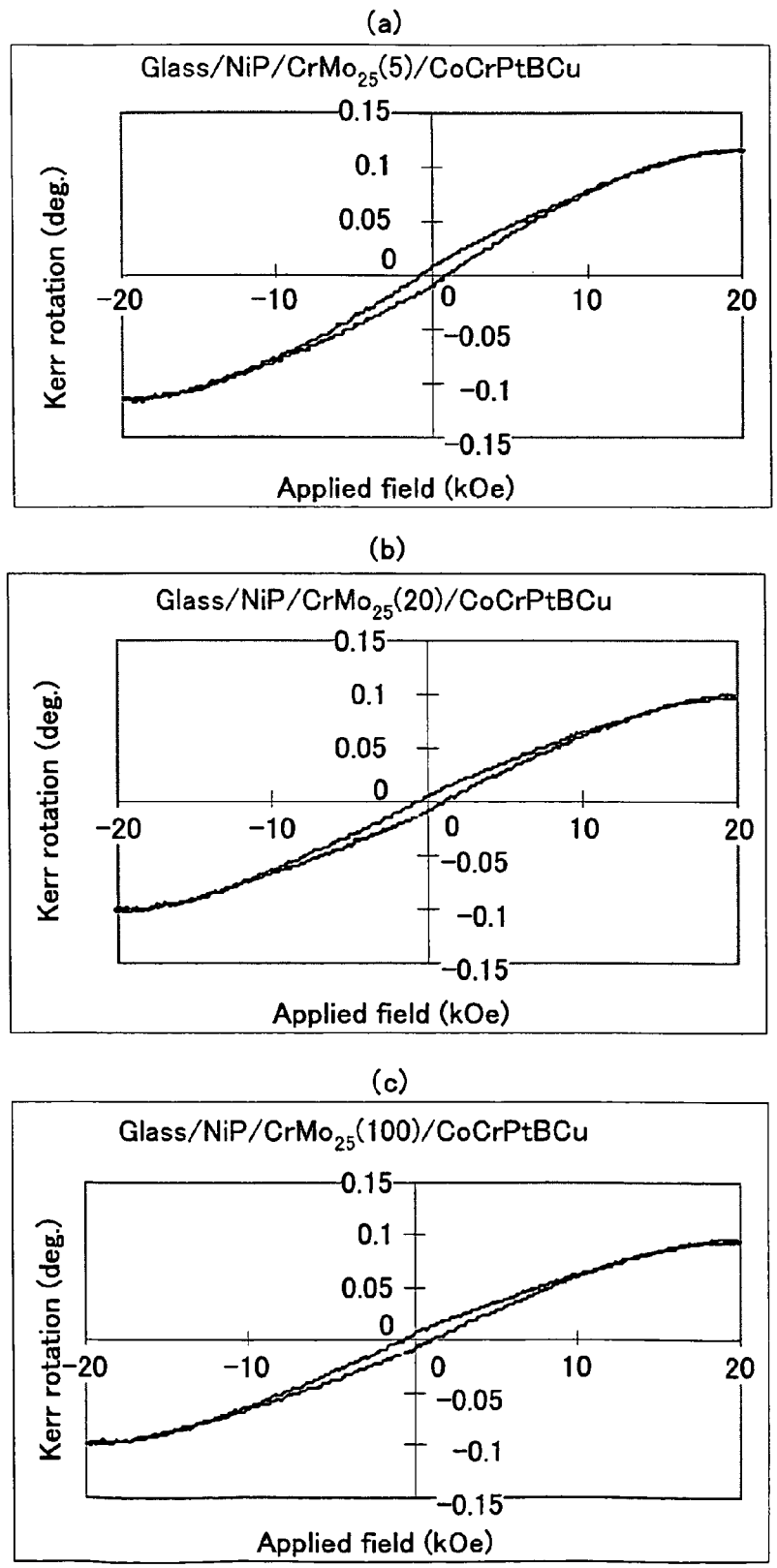
FIGS. 13(a), 13(b) and 13(c) show perpendicular hysteresis loops for explaining performances of samples made on NiP seed layer and CrMo$_{25}$ underlayer.
Figure 14:
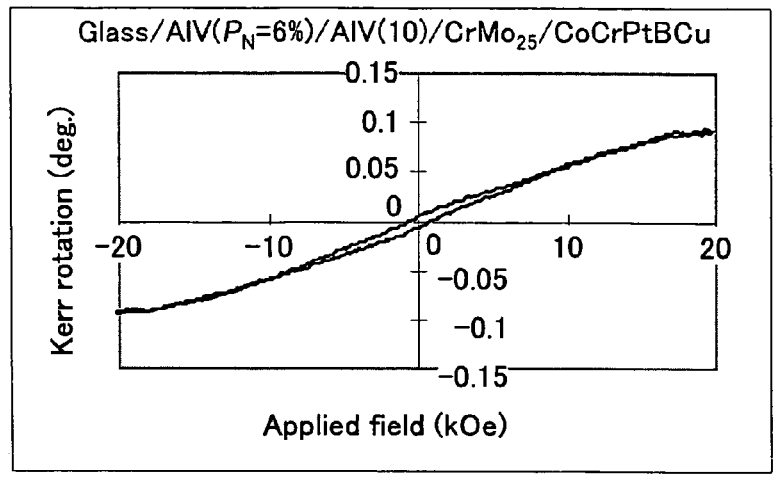
FIGS. 14(a), 14(b) and 14(c) show perpendicular hysteresis loops for explaining performances of samples made on AlVN seed layer.
Figure 14:
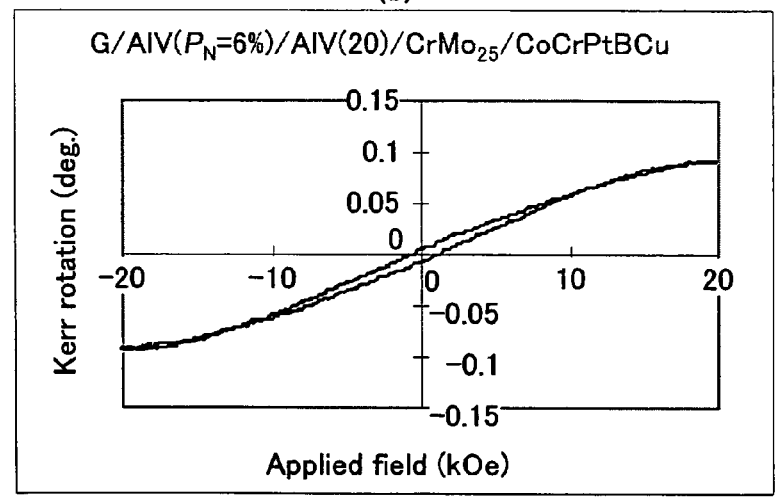
Figure 14:
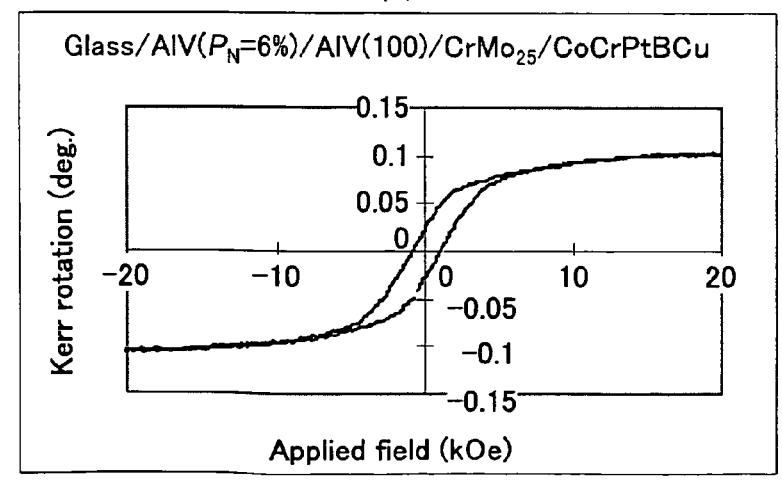

FIGS. 13(a) through 13(c) show perpendicular hysteresis loops for explaining the performance of samples made on NiP seed layer and CrMo$_{25}$ underlayer for different underlayer thicknesses, and FIG. 14(a) through 14(c) show perpendicular hysteresis loops for explaining the performance of samples made on AlVN seed layer for different seed layer thicknesses. In FIGS. 13(a) through 13(c) and FIGS. 14(a) through 14(c), the ordinate indicates the Kerr rotation (degrees), and the abscissa indicates the applied field (kOe).

FIGS. 13(a), 13(b) and 13(c) respectively show the perpendicular hysteresis loops for structures Glass/NiP/CrMo$_{25}$(5 nm)/CoCrPtBCu, Glass/NiP/CrMo$_{25}$(20 nm)/CoCrPtBCu, and Glass/NiP/CrMo$_{25}$(100 nm)/CoCrPtBCu. On the other hand, FIGS. 14(a), 14(b) and 14(c) respectively show the perpendicular hysteresis loops for structures Glass/AlV(P$_N$=6%) /AlV(10 nm)/CrMo$_{25}$/CoCrPtBCu, Glass/AlV(P$_N$=6%) /AlV(20 nm)/CrMo$_{25}$/CoCrPtBCu and Glass/AlV(P$_N$=6%) /AlV(100 nm)/CrMo$_{25}$/CoCrPtBCu. Excellent IPO is observed even at a AlV seed layer thickness of 10 nm. This makes AlV alloys applicable to Glass substrates. Since the adhesion of a sputtered NiP layer is weak, an additional adhesive layer may be necessary, requiring more process chambers, not to mention the need to either reactively sputter NiP with O$_2$ or oxidize its surface. There are also pre-seed layer compositions akin to NiP with good adhesion such as CrMoP and CrNiP. The emerging tendency is that seed layers that promote a (002) growth for Cr are feasible as seed layers for AlV or AlRuV also.

As a consequence of IPO improvement with proper seed layers, it is expected that the kink in SFM magnetization curve is more pronounced. Also, because of this increase in IPO, the exchange coupling would increase between two magnetic layers of the SFM. Apart from that, not only are media read-write properties expected to improve but this also makes it easier to measure the exchange coupling between the magnetic layers which is very useful for mass production control.

It should be noted that since rapid advancements are being made in sputtering processes, it is possible to realize the above described structures by simultaneous sputtering using different pure elemental targets in a multi-cathode assembly. By suitably adjusting the power ratios and the angle of deposition, it is easy to produce the above described structures having the above described performances.

The pre-seed layer described above may be made of a suitable material capable of improving the in-plane orientation of the AlV or AlRuV alloy. Moreover, although the embodiments described above use rigid glass or Al substrates, the present invention may be readily applied to other substrate materials such as metals other than Al, polymers, plastics, and ceramics, which may be rigid or flexible.

Mechanical texturing employed on top of NiP coated substrates are found to be of much superior performance than that without in terms of the signal-to-noise (S/N) ratio and in terms of the thermal decay. In addition, the c-axes (<0001>) of the Co grains with (11$\overline{2}$0) texture are oriented mostly along the circumferential direction in the case of a disk-shaped magnetic recording media, and it is thus an added advantage for the recording to employ a circumferential mechanical texturing, since the head field is also applied along the circumferential direction during operation.

It is known that mechanical texturing applied on the NiP coated substrates, aligns not only the magnetic layer but also the Cr alloy underlayers. Underlayers are grown with (002) texture both with and without mechanical texturing. However, for the former case, Cr<110>direction also preferably gets aligned towards the circumferential direction in the case of the disk-shaped magnetic recording medium. Effectively, a magnetic recording medium of the present invention would also show preferable underlayer and magnetic layer orientation due to either the circumferential mechanical texturing of the substrate or due to the circumferential mechanical texturing of the pre-seed layer like NiP and/or the seed layer and/or the underlayer.

There have been studies on AlRu (B2 structured) as a seed layer on glass and was found to be an excellent material in use with glass substrates for substantial improvement of the IPO over NiP coated glass substrates or NiAl coated glass substrates. However the useful ranges of AlRu where this is applicable (50% of Ru) has a B2 structure, and the cost of the target is very high due to the higher percentage of the Ru content.

Hence, the present invention provides seed layer and underlayer materials which are relatively inexpensive and realize better IPO and grain size reduction of the magnetic layer, to thereby achieve good magnetic and S/N properties for the magnetic recording media having the recording magnetic layer with the single-layer structure or the synthetic ferrimagnetic media (SFM) structure in comparison to magnetic recording media based on AlRu or NiP seed layer coated on glass substrates.

With the present invention, the advantages derived from the SFM structure such as good thermal stability at a reduced Mrt value (remanent magnetization and thickness product) due to antiparallel magnetization configuration are enhanced by the good IPO realized by the seed layer and underlayer materials used in the present invention.

The present inventors confirmed that AlV and AlRuV at low Ru percentages serve the purpose of a good seed layer or underlayer for Co(11$\overline{2}$0) growth of the magnetic layer. Seed layers were made using reactive sputtering of AlV targets with nitrogen or oxygen. For AlRuV also, reactive sputtered seed layers were found to be of superior IPO.

For the above AlV underlayer with the use of AlVN seed layer, XRD spectra showed (002) peak corresponding to $2\theta=62°$ ($\lambda=1.54$), and there was a broad peak also near $2\theta=27°$ ($\lambda=1.54$), meaning the layers are amorphous or the grains are small and uncorrelated with each other. TaN films, depending on the substrate temperature during deposition, sometimes exhibit a broad peak around $2\theta=28°$ ($\lambda=1.54$) suggesting an amorphous structure. The other seed layer materials used in the present invention also show no distinct XRD signature but the subsequent AlV underlayer deposited on any of the seed layers exhibits a (002) peak, and the magnetic layer showed a large distinct (11$\overline{2}$0) texture ($2\theta=74°$). The seed layer was preferably 20 nm to 30 nm thick and the AlV underlayer was preferably 10 nm to 30 nm. The total thickness of the seed layer and underlayer was preferably 30 nm to 60 nm. This preferred range of thicknesses were deposited in just two chambers and reduced the drop in glass substrate temperature during deposition of the subsequent layers.

On the other hand, based on lattice parameter data, the solubility of V in (Al) at 620° C. is about 0.2 at. %. The solubility of V in (Al) can be extended metastably to 0.6 at. % by solidification at rates of 5×10$^4$° C./s. However, in the case of thin film structures made by sputtering, there are many intermetallic compounds detected of Al and V, and the AlV and AlRuV alloy film formed, at almost all of the compositions studied by the present inventors formed a bcc structure which somewhat matches with the lattice dimension of Cr(002) and subsequent Co(11$\bar{2}$0) texture. Therefore, for all AlV compositions and AlRuV compositions for limited values of Ru compositions are useful for lattice matching (and for epitaxial growth) and also for the excellent IPO. In addition, the AlV or AlRuV alloy underlayers and seed layers are less expensive compared to those using AlRu alloys or the like.

Figure 15:
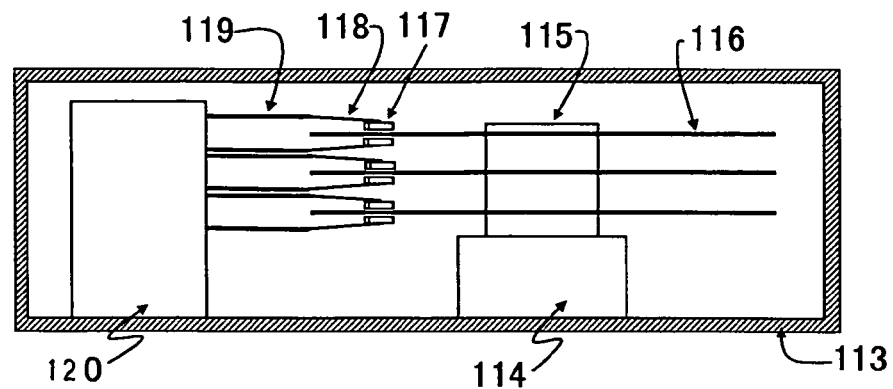
FIG. 15 is a cross sectional view showing the internal structure of an important part of an embodiment of a magnetic storage apparatus.

Next, a description will be given of an embodiment of a magnetic storage apparatus according to the present invention, by referring to FIGS. 15 and 16. FIG. 15 is a cross sectional view showing the internal structure of an important part of this embodiment of the magnetic storage apparatus, and FIG. 16 is a plan view showing the important part of the embodiment of the magnetic storage apparatus shown in FIG. 15.

Figure 16:
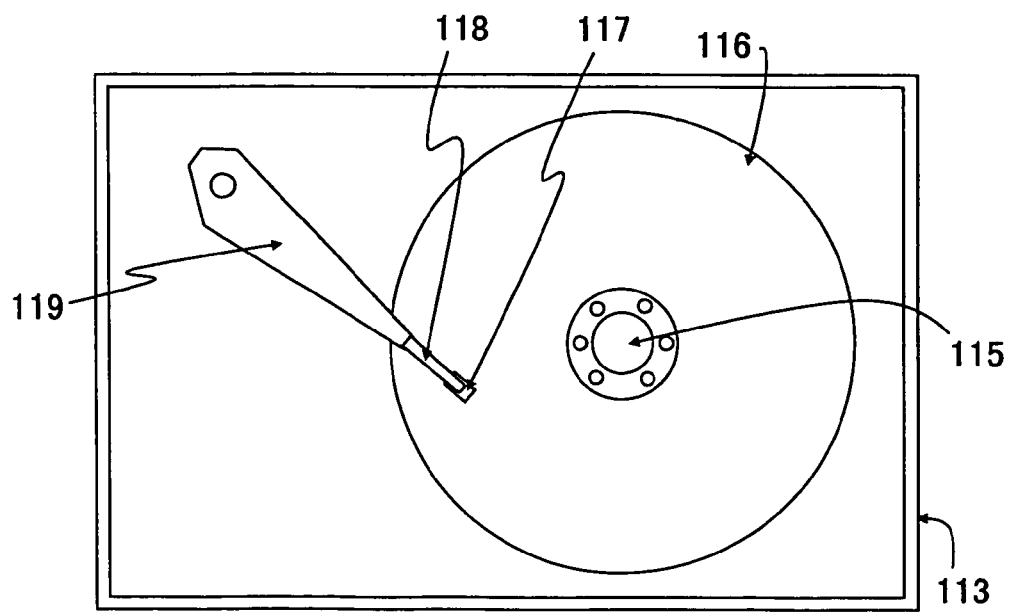
FIG. 16 is a plan view showing the important part of the embodiment of the magnetic storage apparatus shown in FIG. 15.

As shown in FIGS. 15 and 16, the magnetic storage apparatus generally includes a housing 113. A motor 114, a hub 115, a plurality of magnetic recording media 116, a plurality of recording and reproducing heads 117, a plurality of suspensions 118, a plurality of arms 119, and an actuator unit 120 are provided within the housing 113. The magnetic recording media 116 are mounted on the hub 115 which is rotated by the motor 114. The recording and reproducing head 117 is made up of a reproducing head such as a MR and a GMR head for reproducing information from the magnetic recording medium 116, and a recording head such as an inductive head for recording information on the magnetic recording medium 116. Each recording and reproducing head 117 is mounted on the tip end of a corresponding arm 119 via the suspension 118. The arms 119 are moved by the actuator unit 120. The basic structure of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments of the magnetic recording medium described above in conjunction with FIGS. 1 through 14. Of course, the number of magnetic recording media 116 is not limited to three, and only one, two or four or more magnetic recording media 116 may be provided.

The basic structure of the magnetic storage apparatus is not limited to that shown in FIGS. 15 and 16. In addition, the magnetic recording medium used in the present invention is not limited to a magnetic disk, and other magnetic recording media such as magnetic tapes and magnetic cards may be used. Moreover, the magnetic recording medium does not need to be fixedly provided within the housing 113 of the magnetic storage apparatus, and the magnetic recording medium may be a portable type medium which is loaded into and unloaded from the housing 113.

Further, the present invention is not limited to these embodiments, but various variations and modifications may be made without departing from the scope of the present invention.

What is claimed is:

1. A magnetic recording medium comprising:
   a substrate;
   a recording magnetic layer made of a CoCr alloy and having a (11$\bar{2}$0) crystallographic texture; and
   an underlayer, made of an AlRuV alloy, disposed between the substrate and the magnetic layer,
   wherein said underlayer is made of $Al_xRu_yV_z$, where $20 \leq x \leq 70$, $1 \leq y \leq 45$ and $20 \leq z \leq 70$.

2. The magnetic recording medium as claimed in claim 1, wherein said magnetic layer is comprised of a single magnetic layer or, a synthetic ferrimagnetic structure including at least a pair of magnetic layers respectively made of a CoCr alloy and antiferromagnetically coupled via a spacer layer, wherein c-axes of the pair of magnetic layers are significantly parallel to a film plane of the substrate such that $h=Hc\perp/Hc// \leq 0.15$, where $Hc\perp$ denotes a coercivity perpendicular to the film plane and $Hc//$ denotes a coercivity along the film plane.

3. The magnetic recording medium as claimed in claim 1, wherein said underlayer has a thickness in a range of 1 nm to 70 nm.

4. The magnetic recording medium as claimed in claim 1, further comprising:
   an amorphous or polycrystalline seed layer disposed between the underlayer and the substrate.

5. The magnetic recording medium as claimed in claim 4, wherein said seed layer has a thickness in a range of 1 nm to 70 nm.

6. The magnetic recording medium as claimed in claim 4, wherein said seed layer is made of AlV or $Al_xRu_yV_z$, where, $20 \leq x \leq 70$, $1 \leq y \leq 45$ and $20 \leq z \leq 70$.

7. The magnetic recording medium as claimed in claim 4, further comprising:
   a pre-seed layer, made of NiP or CrP, disposed between the substrate and the seed layer.

8. The magnetic recording medium as claimed in claim 4, wherein said seed layer is made of Ta or CrTa.

9. The magnetic recording medium as claimed in claim 1, further comprising:
   an amorphous or polycrystalline seed layer disposed between the underlayer and the substrate,
   said seed layer having a thickness in a range of 20 nm to 30 nm,
   said underlayer having a thickness in a range of 10 nm to 30 nm,
   said seed layer and said underlayer having a total thickness in a range of 30 nm to 60 nm.

10. The magnetic recording medium as claimed in claim 9, wherein said seed layer is made of a AlV or AlRuV alloy.

11. A magnetic storage apparatus comprising:
    at least one magnetic recording medium; and
    a recording and reproducing head recording information on and reproducing information from said at least one magnetic recording medium;
    each magnetic recording medium comprising:
    a substrate;
    a recording magnetic layer made of a CoCr alloy and having a (11$\bar{2}$0) crystallographic texture; and
    an underlayer, made of an AlRuV alloy, disposed between the substrate and the magnetic layers,
    wherein said underlayer is made of $Al_xRu_yV_z$, where $20 \leq x \leq 70$, $1 \leq y \leq 45$ and $20 \leq z \leq 70$.

12. The magnetic storage apparatus as claimed in claim 11, wherein the magnetic layer of the magnetic recording medium is comprised of a single magnetic layer or, a synthetic ferrimagnetic structure including at least a pair of magnetic layers respectively made of a CoCr alloy and antiferromagnetically coupled via a spacer layer, wherein c-axes of the pair of magnetic layers are significantly parallel to a film plane of the substrate such that $h=Hc\perp/Hc// \leq 0.15$, where $Hc\perp$ denotes a coercivity perpendicular to the film plane and $Hc//$ denotes a coercivity along the film plane.

13. The magnetic storage apparatus as claimed in claim 11 or 12, further comprising:
    an amorphous or polycrystalline seed layer disposed between the underlayer and the substrate.

14. The magnetic storage apparatus as claimed in claim 13, wherein the seed layer has a thickness in a range of 20 nm to 30 nm, the underlayer has a thickness in a range of 10 nm to 30 nm, and the seed layer and the underlayer have a total thickness in a range of 30 nm to 60 nm.

15. The magnetic storage apparatus as claimed in claim 14, wherein the seed layer of the magnetic recording medium is made of a AlV or AlRuV alloy.

* * * * *